UNITED STATES PATENT OFFICE.

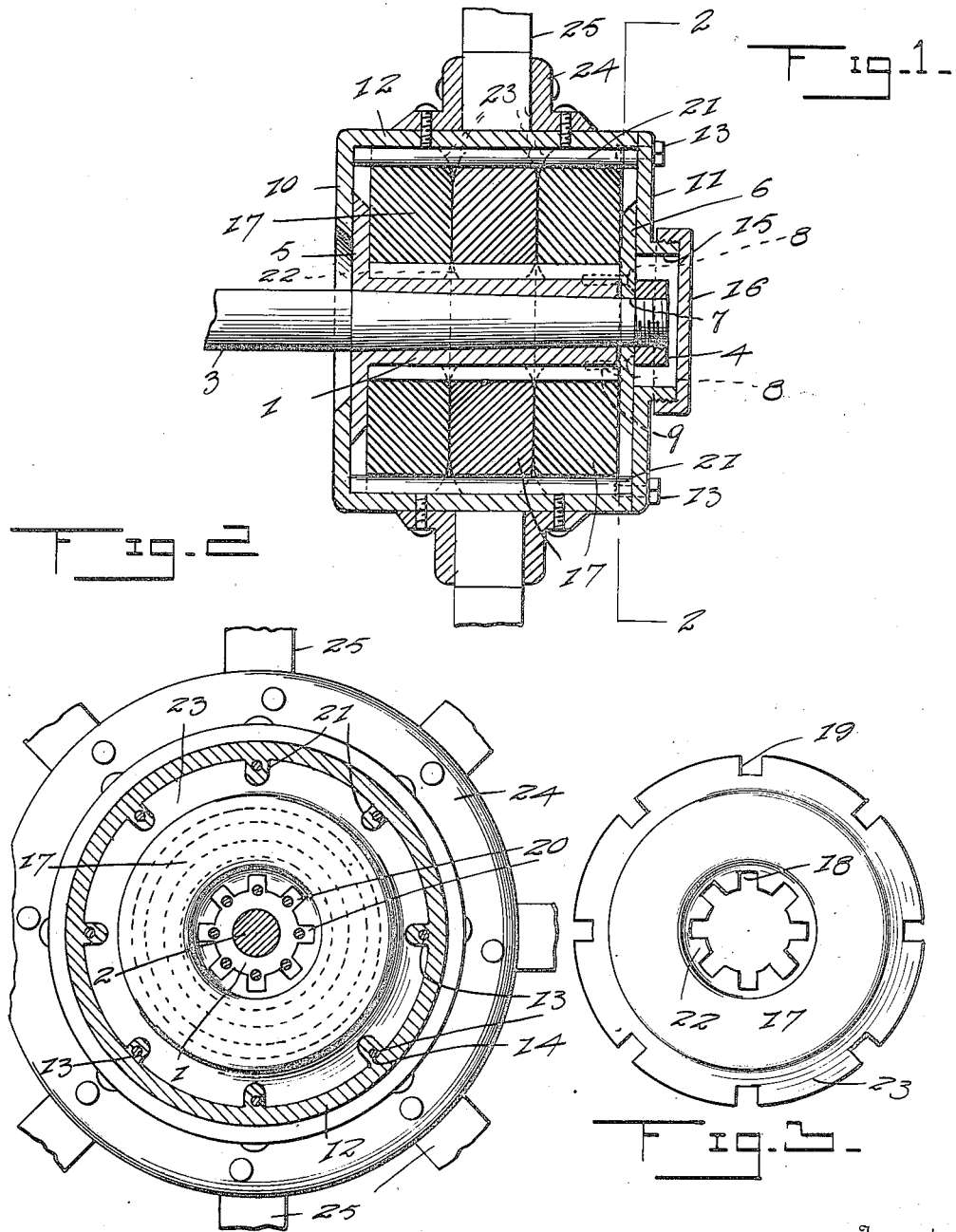

DAVID S. McFERREN, OF QUENEMO, KANSAS.

CUSHIONED SHOCKLESS WHEEL.

1,259,541. Specification of Letters Patent. Patented Mar. 19, 1918.

Application filed May 27, 1916. Serial No. 100,389.

*To all whom it may concern:*

Be it known that I, DAVID S. McFERREN, a citizen of the United States, residing at Quenemo, in the county of Osage and State of Kansas, have invented certain new and useful Improvements in Cushioned Shockless Wheels; and I do hereby declare the following to be a full, clear, and exact description of the invention, such as will enable others skilled in the art to which it appertains to make and use the same.

The invention relates to a cushioned shockless wheel.

The object of the present invention is to improve the construction of cushioned wheels and to provide a simple, practical and efficient cushioned wheel of strong and durable construction designed for use on various kinds of vehicles and equipped in its hub with a plurality of resilient cushioning rings adapted to absorb and dissipate shocks and jars and designed to obviate the necessity of employing pneumatic tires and similar cushioning means exposed at the rim of the wheel and liable to injury through contact with the surface of the road.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing

Figure 1 is a fragmental transverse sectional view of a cushioned wheel constructed in accordance with this invention, the section being taken longitudinally of the axle, Fig. 2 is a sectional view on the line 2—2 of Fig. 1.

Fig. 3 is a detail view of one of the cushioning rings.

Like numerals of reference designate corresponding parts in the several figures of the drawing.

In the accompanying drawing in which is illustrated the preferred embodiment of the invention, the cushioned wheel comprises in its construction, an axle box or thimble 1 adapted to be mounted on the spindle 2 of an axle 3 in the ordinary manner and secured to the same by an axle nut 4. The axle box is provided at its inner end with an annular flange 5 preferably cast integral with the axle box and secured to the outer end of the latter is a flange 6. The flange 6 which corresponds with the flange 5 is provided with a central axle receiving opening 7 and it is secured to the outer end of the axle box by screws 8 which pierce the inner portion of the flange 6 and engage threaded sockets 9 in the outer end of the axle box. The flanges 5 and 6 which have their outer edges beveled as shown slidably fit against the inner faces of a flange 10 and an outer plate or flange member 11 of a shell 12 which constitutes a casing for the hub. The flange 10 is formed integral with the outer shell 12 and the outer plate or flange member 11 which is of angular form is secured by screws 13 to the shell. The screws 13 pierce the outer plate or flange member 11 and engage threaded sockets 14 of the shell 12. The outer flange member is also preferably provided with a threaded flange 15 to receive an interiorly threaded cap 16 but the latter may be mounted on the outer flange member 11 in any other desired manner as will be readily understood.

The hub is cushioned by a plurality of rings 17 constructed of rubber or other suitable resilient material and fitted around the axle box and extending from the same to the inner face of the shell 12 and provided at their inner and outer peripheries with grooves 18 and 19 in which are fitted transverse ribs 20 and 21 formed integral with the axle box and the outer shell 12 respectively and extending entirely across the same between the inner and outer flanges of the axle box and the said shell. The transverse ribs besides interlocking the cushioning members with the inner and outer relatively slidable sections of the hub thicken the axle box and the shell at the points where the removable flanges are secured to the said axle box and the outer shell and form convenient means for forming sockets in such parts. The cushioning rings are also tapered at their inner and outer portions at 22 and 23 and by varying the size and configuration of the cushioning rings at the inner and outer portions thereof, the resiliency of the wheel may be varied. The cushioning rings are fitted together at their intermediate portions and their inner and outer portions are spaced apart to provide ample space for the expansion and contraction of the cushioning devices.

Mounted upon the shell are rings 24 which are spaced apart to receive the spokes 25 of the wheel. The outer portion of the wheel and the manner of attaching the spokes to the hub may be of any desired construction as will be readily understood.

What is claimed is:—

A cushioned wheel comprising a hollow cylindrical hub having at its inner end an integral and inwardly directed flange, circumferentially spaced ribs integral with the inner surface of the hub and flange and extending transversely from the flange to the outer end of the hub and provided at their outer ends with threaded sockets, a second flange applied to the outer end of the hub, screws passing through the second flange and engaging in the sockets, a thimble mounted in the hub and provided at its inner end with an integral flange engaging the inner side of the first flange, circumferentially spaced ribs integral with the outer surface of the thimble and its flange and extending transversely from said flange to the outer end of the thimble and provided at their outer ends with threaded sockets, a flange applied to the outer end of the thimble and engaging the inner side of the outer hub flange, screws passing through the outer flange of the thimble and engaging in the sockets of the thimble ribs, and a plurality of resilient rings mounted upon the thimble between the flanges thereof and engaging the thimble and hub, said rings having grooves receiving said ribs.

In testimony whereof I affix my signature in presence of two witnesses.

DAVID S. McFERREN.

Witnesses:
G. N. MARSHALL,
A. W. ATHON.